US008068737B2

(12) United States Patent
Shimizu

(10) Patent No.: US 8,068,737 B2
(45) Date of Patent: Nov. 29, 2011

(54) REMOTE CONTROL DEVICE, APPARATUS CONTROL DEVICE, AND REMOTE CONTROL METHOD

(75) Inventor: Taketoshi Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 11/414,178

(22) Filed: May 1, 2006

(65) Prior Publication Data

US 2006/0263091 A1 Nov. 23, 2006

(30) Foreign Application Priority Data

May 18, 2005 (JP) ................................ 2005-145914

(51) Int. Cl.
*H04B 10/00* (2006.01)

(52) U.S. Cl. ........ 398/106; 398/107; 398/108; 398/109; 398/111

(58) Field of Classification Search .......... 398/106–112, 398/128
See application file for complete search history.

(56) References Cited

U.S. PATENT DOCUMENTS

| | | | | | |
|---|---|---|---|---|---|
| 2,177,633 | A | * | 10/1939 | Blackard | 264/563 |
| 4,514,732 | A | * | 4/1985 | Hayes, Jr. | 340/825.57 |
| 4,764,981 | A | * | 8/1988 | Miyahara et al. | 398/33 |
| 5,418,527 | A | * | 5/1995 | Yashiro | 340/4.37 |
| 5,815,297 | A | * | 9/1998 | Ciciora | 398/112 |
| 5,854,594 | A | * | 12/1998 | Lin et al. | 348/734 |
| 5,969,835 | A | * | 10/1999 | Kamieniecki et al. | 398/33 |
| 5,973,810 | A | * | 10/1999 | Song | 398/112 |
| 6,567,011 | B1 | * | 5/2003 | Young et al. | 340/825.69 |
| 7,177,633 | B2 | * | 2/2007 | Ishiwatari | 455/418 |
| 7,266,301 | B2 | * | 9/2007 | Stanchfield et al. | 398/126 |
| 7,378,984 | B2 | * | 5/2008 | Suzuki et al. | 340/825.69 |
| 7,969,279 | B2 | * | 6/2011 | Nakamura | 340/3.1 |
| 2004/0248543 | A1 | * | 12/2004 | Itsukaichi | 455/345 |
| 2005/0190053 | A1 | * | 9/2005 | Dione | 340/500 |
| 2006/0136977 | A1 | * | 6/2006 | Henry | 725/133 |

FOREIGN PATENT DOCUMENTS

| | | |
|---|---|---|
| JP | 6-113032 | 4/1994 |
| JP | 10-178684 | 6/1998 |
| JP | 11-146467 | 5/1999 |
| JP | 2003-259465 A | 9/2003 |
| JP | 2004-15449 | 1/2004 |

* cited by examiner

*Primary Examiner* — Kenneth N Vanderpuye
*Assistant Examiner* — Hibret Woldekidan
(74) *Attorney, Agent, or Firm* — Oblon, Spivak, McClelland, Maier & Neustadt, L.L.P.

(57) ABSTRACT

A remote control method for remotely controlling a plurality of electronic apparatuses connected to an apparatus control device using a remote control device includes the following steps. The remote control device sends the apparatus control device control data necessary for an infrared control operation, which includes a port number, assigned to a port of the apparatus control device, associated with a selected electronic apparatus and an infrared code for the selected apparatus control device. The apparatus control device then receives the control data sent from the remote control device. The apparatus control device generates an infrared signal based on the infrared code included in the received control data. An infrared-transmitting unit, connected to the port specified by the port number included in the control data, transmits the infrared signal to the electronic apparatus corresponding to the infrared-transmitting unit.

8 Claims, 15 Drawing Sheets

FIG. 3

| PORT NUMBER | ELECTRONIC APPARATUS |
|---|---|
| P1 | ELECTRONIC APPARATUS 11 |
| P2 | ELECTRONIC APPARATUS 12 |
| P3 | ELECTRONIC APPARATUS 13 |
| P4 | ELECTRONIC APPARATUS 14 |
| P5 | ELECTRONIC APPARATUS 15 |

FIG. 4

| ELECTRONIC APPARATUS | INFRARED CODES |
|---|---|
| ELECTRONIC APPARATUS 11 | Ca1,Ca2,..... |
| ELECTRONIC APPARATUS 12 | Cb1,Cb2,..... |
| ELECTRONIC APPARATUS 13 | Cc1,Cc2,..... |
| ELECTRONIC APPARATUS 14 | Cd1,Cd2,..... |
| ELECTRONIC APPARATUS 15 | Ce1,Ce2,..... |

REMOTE CONTROL DEVICE, APPARATUS CONTROL DEVICE, AND REMOTE CONTROL METHOD

CROSS REFERENCES TO RELATED APPLICATIONS

The present invention contains subject matter related to Japanese Patent Application JP 2005-145914 filed in the Japanese Patent Office on May 18, 2005, the entire contents of which are incorporated herein by reference.

BACKGROUND OF THE INVENTION

1. Field of the Invention

The present invention relates to a remote control device for remotely controlling electronic apparatuses, an apparatus control device to which a plurality of electronic apparatuses to be controlled by the remote control device is connected, and a remote control method.

2. Description of the Related Art

Electronic apparatuses, such as, for example, VTRs (video tape recorders), DVD (Digital Versatile Disc) players, and BS (Broadcasting Satellite) tuners, having infrared communication ports can be remotely controlled using remote control devices by receiving infrared control signals sent from the remote control devices. When remotely controlling a plurality of electronic apparatuses having the infrared communication ports, users have to direct infrared-transmitting unit of the remote control device toward the target electronic apparatus because of the directivity of infrared rays, which leads to poor usability.

Accordingly, communication systems for remotely controlling a plurality of electronic apparatuses have been suggested (see, for example, Japanese Unexamined Patent Application Publication No. 2004-220106). In this example system, an apparatus control device receives operation commands from a remote control device, and sends the received operation commands to a server device. The plurality of electronic apparatuses is connected to this server device. Thus, remote control operations on the electronic apparatuses are performed through this server device.

SUMMARY OF THE INVENTION

Different types of electronic apparatus, such as DVD players and video tape recorders, utilize different operation commands, i.e., infrared codes. Accordingly, when the operation commands are sent to a target electronic apparatus, specifying a port of the server device to which a target electronic apparatus is connected is not necessary. That is, sending the infrared codes automatically specifies the corresponding electronic apparatus.

In such a case, when electronic apparatuses of the same type, for example, two DVD players, are connected to the server device, both of the electronic apparatuses undesirably operate at the same time. According to the above-mentioned patent document, separate server devices are provided for each of the two DVD players.

However, providing two or more server devices not only increases the cost but also requires more space for installing the server devices.

In view of the above-described disadvantages, embodiments of the present invention implement remote control operations performed on a specific electronic apparatus selected from a plurality of electronic apparatuses using one apparatus control device regardless of the types of electronic apparatus used.

To this end, according to an embodiment of the present invention, when an infrared remote control operation is performed on a plurality of electronic apparatuses connected to an apparatus control device using a remote control device, the remote control device sends control data necessary for the infrared control operation, which includes a port number, assigned to a port of the apparatus control device, associated with a selected electronic apparatus and an infrared code for the selected apparatus control device, to the apparatus control device. The apparatus control device receives the control data necessary for the infrared control operation sent from the remote control device, and generates an infrared signal based on the infrared code included in the received control data necessary for the infrared control operation. An infrared-transmitting unit, connected to the port specified by the port number included in the received control data necessary for the infrared control operation, transmits the infrared signal to the electronic apparatus corresponding to the infrared-transmitting unit.

In the above-described configurations, the control data necessary for the infrared control operation corresponding to a user's key input operation includes the port number assigned to the port of the apparatus control device and the infrared code for the electronic apparatus associated with the port number. Accordingly, even when a plurality of electronic apparatuses is connected to an apparatus control device, the target electronic apparatus can be specified easily using the port number.

According to the embodiments of the present invention, the control data necessary for the infrared control operation corresponding to the user's key input operation includes the port number of the apparatus control device and the infrared code for the electronic apparatus associated with the port number. Accordingly, even when a plurality of electronic apparatuses is connected to an apparatus control device, the target electronic apparatus can be specified easily using the port number, thus causing the target electronic apparatus to perform the desired operation without fail. That is, regardless of the types of electronic apparatus used, infrared remote control operations on the specific electronic apparatus selected from the plurality of electronic apparatuses can be implemented using one apparatus control device.

BRIEF DESCRIPTION OF THE DRAWINGS

FIG. 3 is a table showing an association between port numbers of the apparatus control device and electronic apparatuses according to a first exemplary embodiment of the present invention;

FIG. 4 is a table showing an association between electronic apparatuses and infrared codes according to a first exemplary embodiment;

DESCRIPTION OF THE PREFERRED EMBODIMENTS

Exemplary embodiments of the present invention will be described below. However, the present invention is not limited to the following embodiments.

Figure 1:
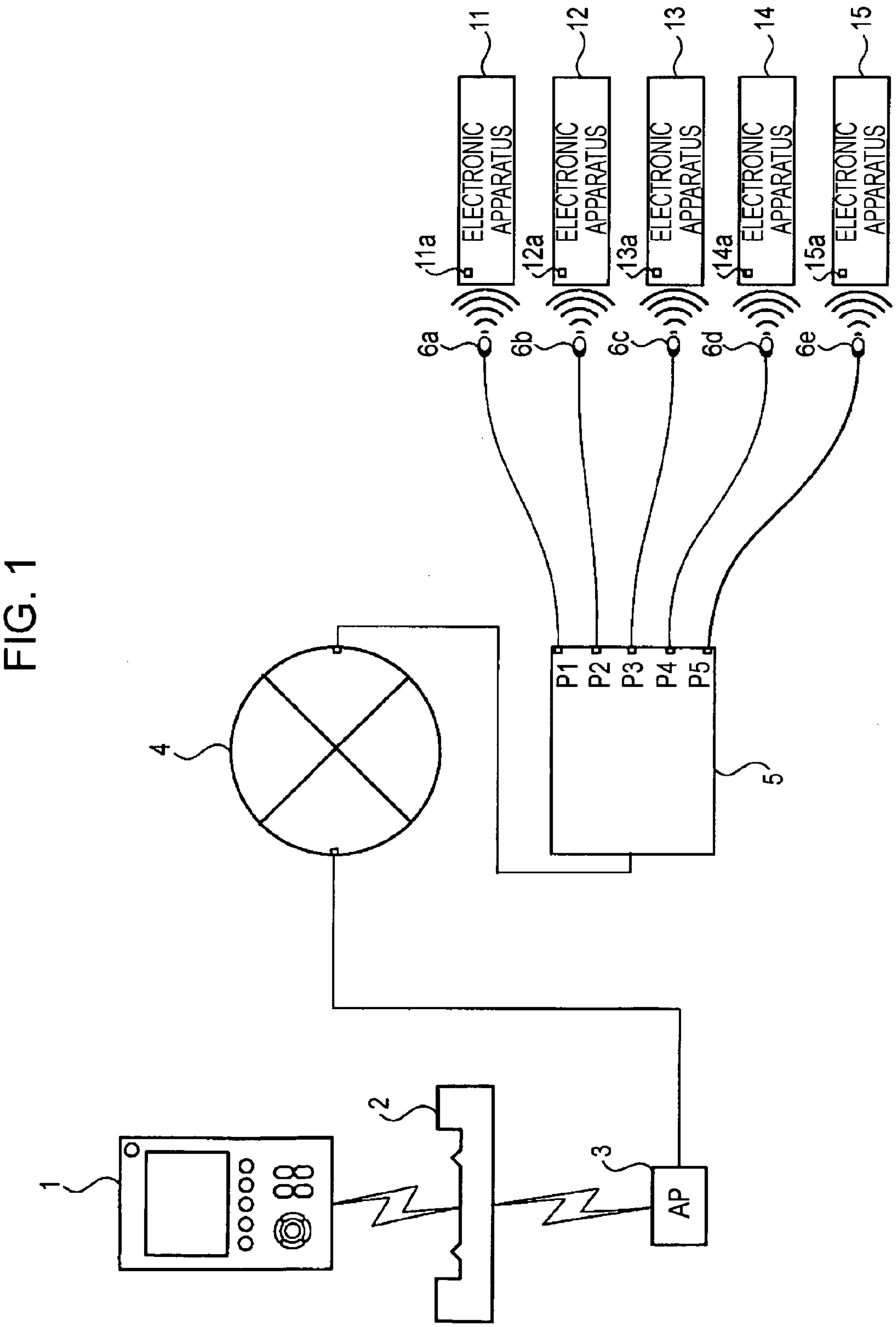
FIG. 1 shows a system configuration according to a first exemplary embodiment of the present invention.

FIG. 1 shows a system configuration according to a first exemplary embodiment of the present invention. As shown in FIG. 1, the system includes: a remote control device 1 for performing a so-called remote control operation; a cradle 2; a wireless access point (hereinafter, referred to as "AP") 3; a communication network 4, such as LAN (Local Area Network); and an apparatus control device 5. The apparatus control device 5 has ports P1, P2, P3, P4, and P5, to which infrared-transmitting units 6*a*, 6*b*, 6*c*, 6*d*, and 6*e* are connected, respectively. Electronic apparatuses 11, 12, 13, 14, and 15 have infrared-receiving units 11*a*, 12*a*, 13*a*, 14*a*, and 15*a*, respectively. The infrared-transmitting units 6*a*, 6*b*, 6*c*, 6*d*, and 6*e* and the infrared-receiving units 11*a*, 12*a*, 13*a*, 14*a*, and 15*a*, respectively, are provided facing each other. Various electronic apparatuses, such as, for example, a video tape recorder, a CD (Compact Disc) player, a DVD (Digital Versatile Disc) player, and a HDD (Hard Disk Drive) player can be, but not exclusively, used in the system. The infrared-transmitting units 6*a*, 6*b*, 6*c*, 6*d*, and 6*e* and the corresponding infrared-receiving units 11*a*, 12*a*, 13*a*, 14*a*, and 15*a* may be provided separated from each other at a distance within a reachable range of infrared signals.

In the above-described system, the remote control device 1 and the cradle 2 communicate with each other via a non-IP (Internet Protocol) wireless connection. This non-IP wireless connection can be handled as a serial bus or an internal bus having an independent communication channel. The cradle 2, the AP 3, the communication network 4, and the apparatus control device 5 communicate with each other using the IP. The cradle 2 performs conversion processing in order to handle non-IP data sent from the remote control device 1 in the IP, and implements wireless communication based on, for example, IEEE (Institute of Electrical and Electronics Engineers) 802.11. The AP 3 serves as an IP bridge for transferring the data received from the cradle 2 to the communication network 4 constructed using Ethernet® or the like. From the data sent from the communication network 4 using the IP, the apparatus control device 5 extracts information necessary for an infrared control operation. Then, the apparatus control device 5 transmits the extracted information using the infrared signals so as to control the electronic apparatuses connected thereto.

Figure 2:
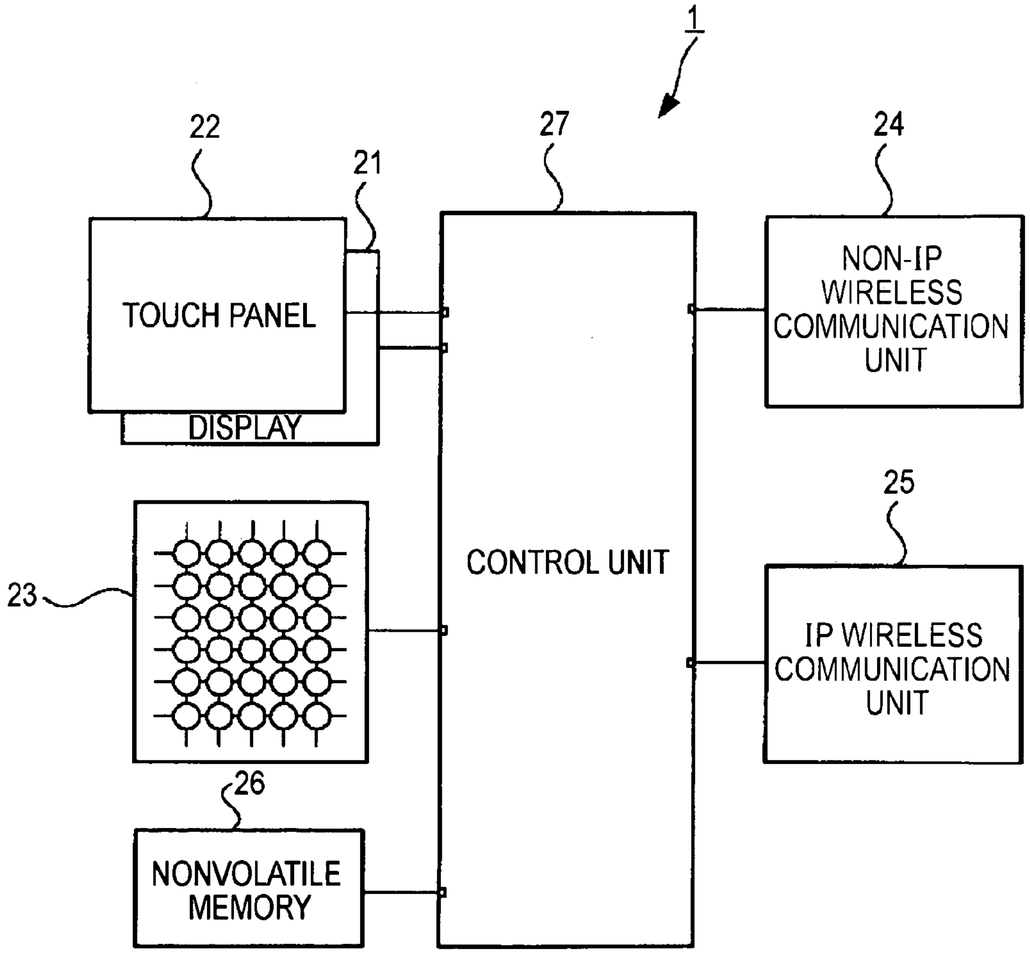
FIG. 2 shows a block configuration of a remote control device according to a first exemplary embodiment of the present invention.

FIG. 2 shows an exemplary block configuration of the remote control device 1. The remote control device 1 includes: a display 21, such as a liquid crystal display; a touch panel 22 disposed on the display 21; a key-inputting unit 23 having push buttons and a jog dial; a non-IP wireless communication unit 24 for communicating with the cradle 2; an IP wireless communication unit 25; a nonvolatile memory 26, such as, for example, a flash memory; and a control unit 27 having a CPU (Central Processing Unit) or the like for performing controls on the aforementioned units and various kinds of arithmetic processing. Each of these units may be connected through a bus.

The nonvolatile memory 26 stores a first table and a second table. In the first table, the port numbers P1 to P5 assigned to the ports of the apparatus control device 5 and the electronic apparatuses 11 to 15 connected to one of the ports of the apparatus control device 5 are associated. In the second table, the electronic apparatuses 11 to 15 and infrared codes used for controlling the corresponding electronic apparatuses are associated.

FIG. 3 shows an example table stored in the nonvolatile memory 26 of the remote control device 1. The table shows the association between the port numbers P1 to P5 of the apparatus control device 5 and the electronic apparatuses 11 to 15 connected to one of the ports.

FIG. 4 also shows an example table stored in the nonvolatile memory 26 of the remote control device 1. The table of FIG. 4 shows the association between the electronic apparatuses 11 to 15 and the infrared codes used for controlling the selected electronic apparatuses 11 to 15. For example, regarding the electronic apparatus 11, the infrared codes such as "Ca1" and "Ca2" are assigned to the operations such as "playback" and "stop", respectively.

When the electronic apparatuses 11 and 12 are of different types (e.g., the video tape recorder and the DVD player, different infrared codes (e.g., "Ca1" and "Cb1") are used to perform the same playback function.

In contrast, when the electronic apparatuses 11 and 12 are of the same type (e.g., both are the DVD players), the same infrared code is used to perform the playback function.

Figure 5:
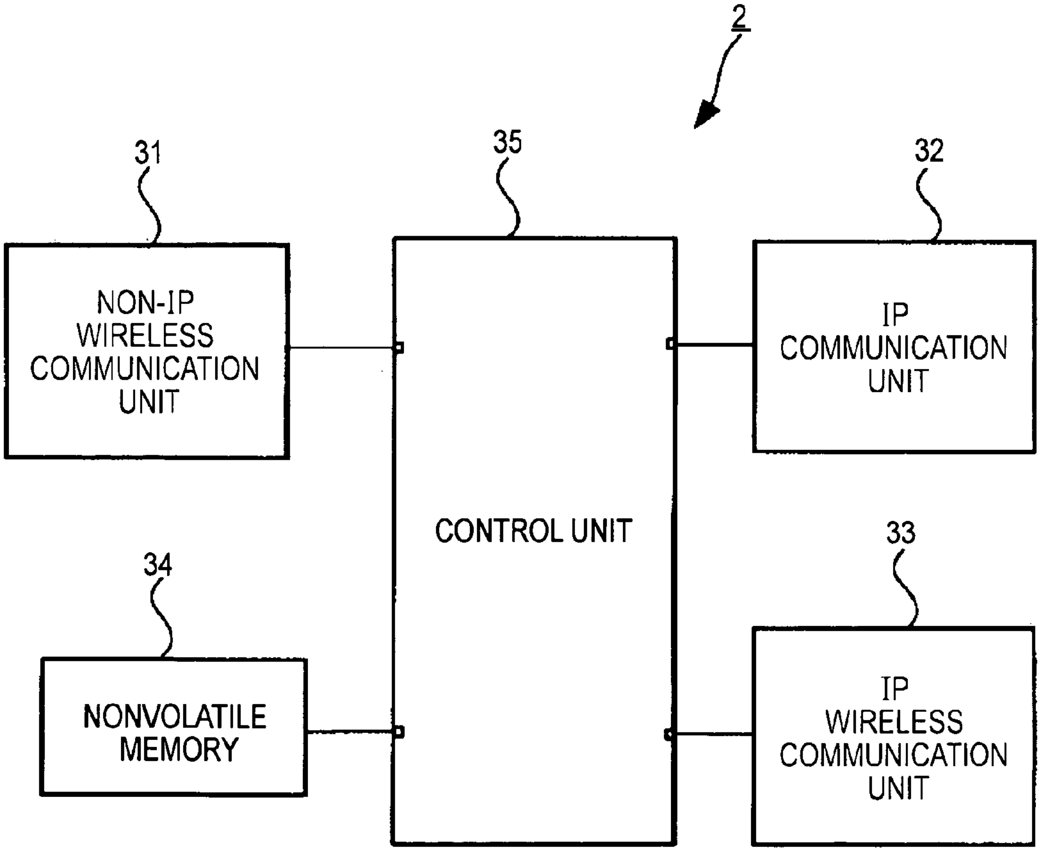
FIG. 5 shows a block configuration of a cradle according to a first exemplary embodiment of the present invention.

FIG. 5 shows an exemplary block configuration of the cradle 2. The cradle 2 communicates with the remote control device 1 and the AP 3, and charges the remote control device 1. The cradle 2 includes: a non-IP wireless communication unit 31 for communicating with the remote control device 1; an IP communication unit 32 for communicating with the communication network 4; an IP wireless communication unit 33; a nonvolatile memory 34, such as, for example, a flash memory; and a control unit 35 having a CPU or the like for performing controls on the aforementioned units and various kinds of arithmetic processing. Each of these units may be connected through a bus.

Figure 6:
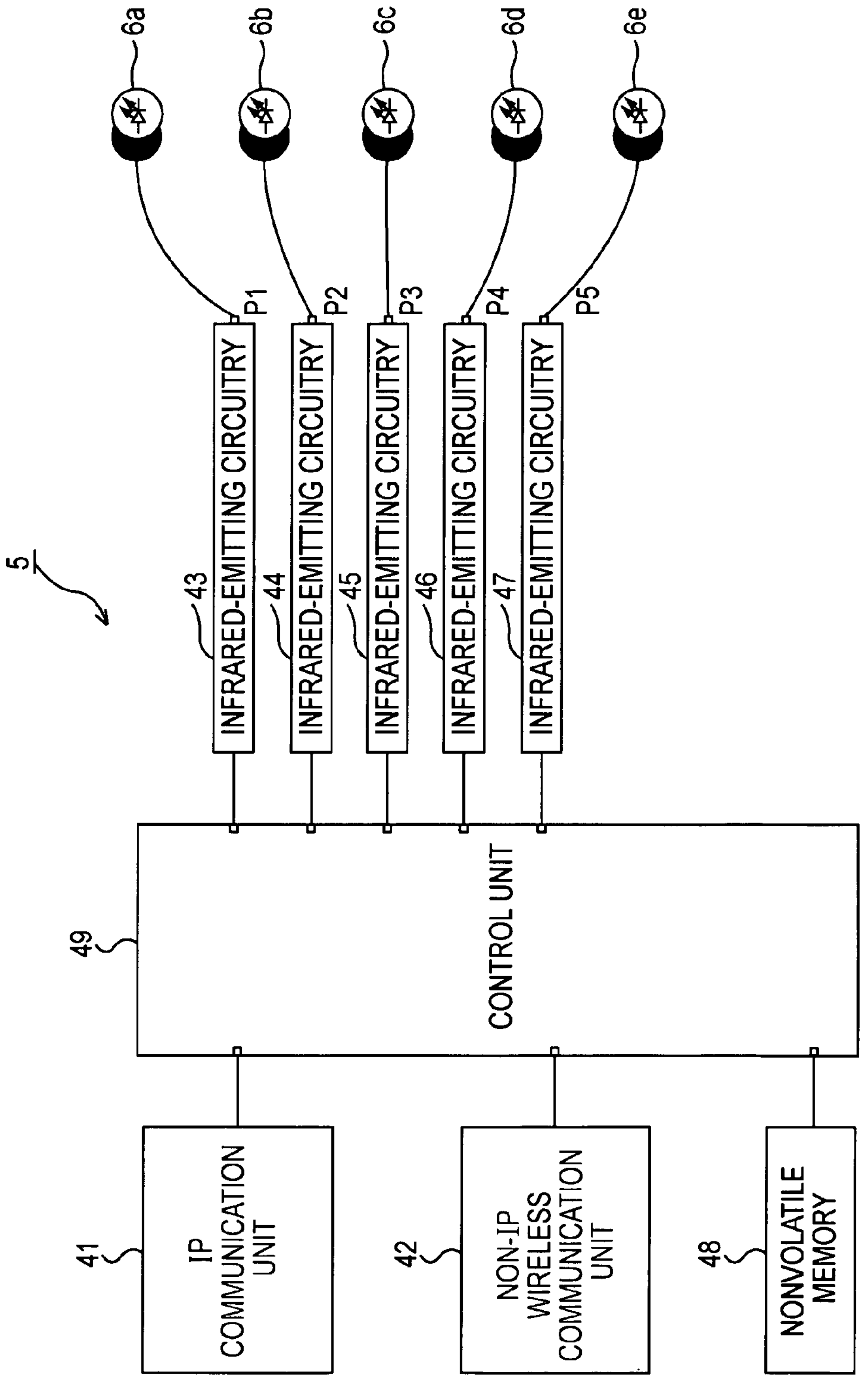
FIG. 6 shows a block configuration of an apparatus control device according to a first exemplary embodiment of the present invention.

FIG. 6 shows an exemplary block configuration of the apparatus control device 5. The apparatus control device 5 performs various controls on the electronic apparatuses 11 to 15 connected thereto. More specifically, the apparatus control device 5 converts control data necessary for an infrared control operation (hereinafter, referred to as "control data") sent from the remote control device 1 into infrared signals. The infrared-transmitting unit, connected to the port having the port number specified by the control data, then transmits the generated infrared signals. The apparatus control device 5 includes: an IP communication unit 41 for communicating with the communication network 4; a non-IP wireless communication unit 42; infrared-emitting circuitries 43, 44, 45, 46, and 47 for generating infrared signals; a nonvolatile memory 48, such as, for example, a flash memory; and a control unit 49 having a CPU or the like for performing controls on the aforementioned units and various kinds of arithmetic processing. Each of these units may be connected through a bus.

The infrared-emitting circuitries 43 to 47 are connected to the infrared-transmitting units 6*a* to 6*e* through the ports P1 to P5, respectively.

Now, an operation of the system configuration according to the first exemplary embodiment will be described.

Figure 7:
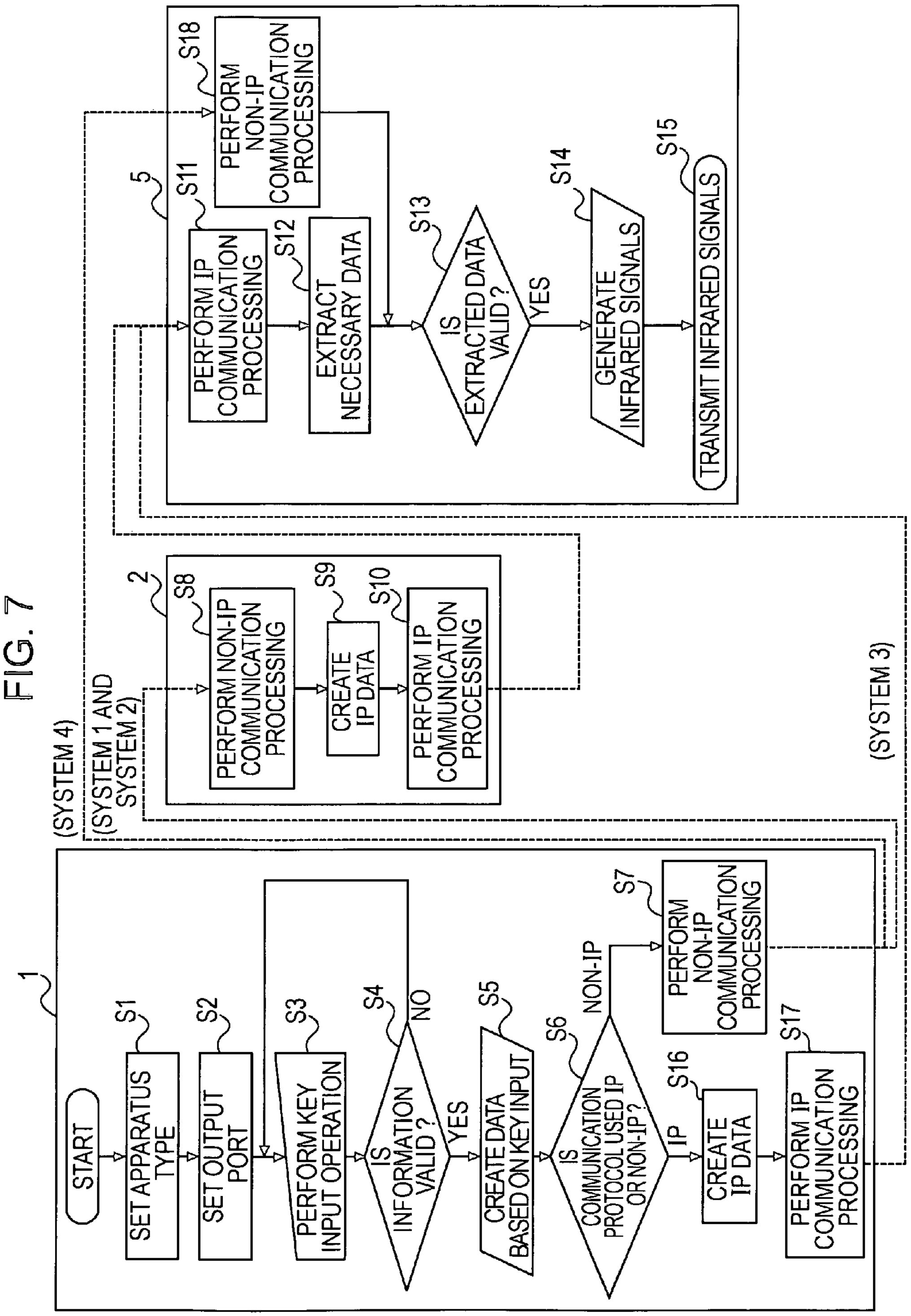
FIG. 7 is an operation flowchart according to first, second, third, and fourth exemplary embodiments.

FIG. 7 is a flowchart illustrating operations of the remote control device 1, the cradle 2, and the apparatus control device 5. Before performing the remote control operation, a user sets the types of the electronic apparatus connected to the apparatus control device 5. The control unit 27 registers the set type information in the second table stored in the nonvolatile memory 26 (at STEP S1). The user then sets the port of the apparatus control device 5 to which the target electronic apparatus is connected. In response to this operation, the control unit 27 registers the set port number information in the first table stored in the nonvolatile memory 26 (at STEP S2).

Figure 8:
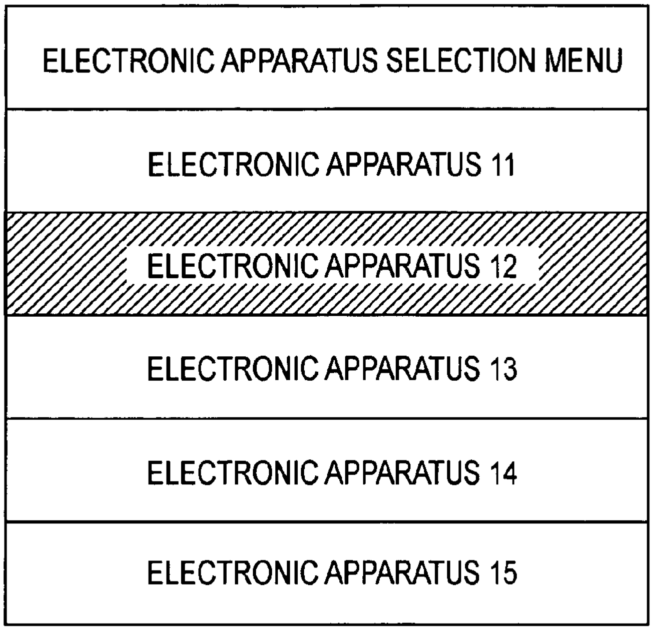
FIG. 8 is an exemplary menu screen for selecting electronic apparatuses according to a first exemplary embodiment of the present invention.
Figure 9:
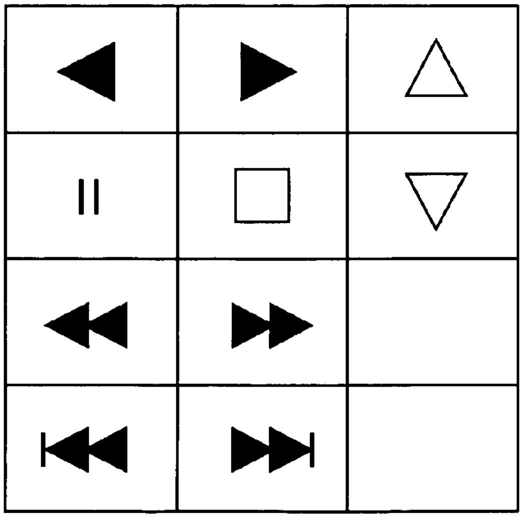
FIG. 9 is an exemplary operation menu screen according to a first exemplary embodiment of the present invention.

After setting the type and the port number, the user performs an input operation using the key-inputting unit 23 (at STEP S3). FIG. 8 shows an exemplary GUI (Graphical User Interface) of a menu screen for selecting the electronic apparatuses displayed when the user performs the remote control operations. For example, if the user selects the electronic apparatus 12 on this menu screen, the current screen is switched to the next. FIG. 9 shows an exemplary operation menu screen for the selected electronic apparatus 12. In this example, selectable operations such as normal speed forward playback, normal speed reverse playback, stop, pause, fast forward playback, fast reverse playback, skip forward, skip backward, and volume adjustment are shown. In response to the key input operation performed by the user, the process proceeds to the next step.

Then, the control unit 27 identifies content of the key input, and determines whether the content is valid or not (at STEP S4). If the content is invalid, the process returns to STEP S3. If the content is determined to be valid at STEP S4, the control unit 27 creates data corresponding to the key input (i.e., the control data necessary for the infrared control operation) in order to control the target electronic apparatus using the remote control device 1 (at STEP S5).

Figure 10:
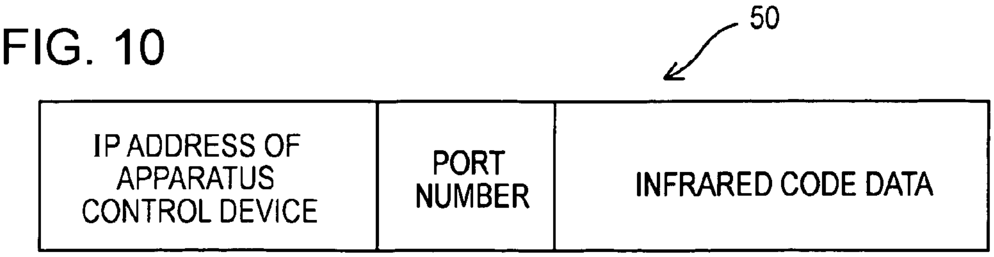
FIG. 10 shows control data necessary for an infrared control operation according to a first exemplary embodiment of the present invention.

FIG. 10 shows an example of the control data necessary for the infrared control operation. As shown in FIG. 10, the control data 50 includes an IP address of the apparatus control device 5, a port number, and infrared code data. For example, when non-IP communication is carried out, a header used for the non-IP communication is created if necessary. By including the port number in the control data, even when there is a plurality of target electronic apparatuses to be controlled, the electronic apparatus associated with the port number can be identified easily, thus causing the target electronic apparatus to perform the desired operation without fail.

Then, the control unit 27 identifies the communication protocol to be used for communicating with external apparatuses (at STEP S6). In this example, since the remote control device 1 communicates with the cradle 2, non-IP communication processing is performed (at STEP S7).

The remote control device 1 sends the control data necessary for the infrared control operation to the cradle 2. The cradle 2 performs the non-IP communication processing, and receives the control data (at STEP S8). After creating the control data in the IP format (at STEP S9), the cradle 2 performs IP communication processing (at STEP S10) so as to send the control data to the apparatus control device 5 through the AP 3 and the communication network 4 (not shown in FIG. 7).

The apparatus control device 5 performs the IP communication processing, and receives the control data (at STEP S11). The apparatus control device 5 then extracts the necessary data from the control data in the IP format (at STEP S12). The validity of the extracted data is determined next (at STEP S13). If the extracted data is valid, the infrared-emitting circuitry, corresponding to the port number included in the control data, generates infrared-emitting data (i.e., the infrared signals) (at STEP S14). The infrared-transmitting unit connected to the infrared-emitting circuitry transmits the generated infrared signal including the infrared code of the control command to the corresponding electronic apparatus (at STEP S15).

Upon receiving the infrared signal transmitted from the infrared-transmitting unit of the apparatus control device 5, the electronic apparatus performs a predetermined control operation on the basis of the infrared code included in the infrared signal.

Figure 11:
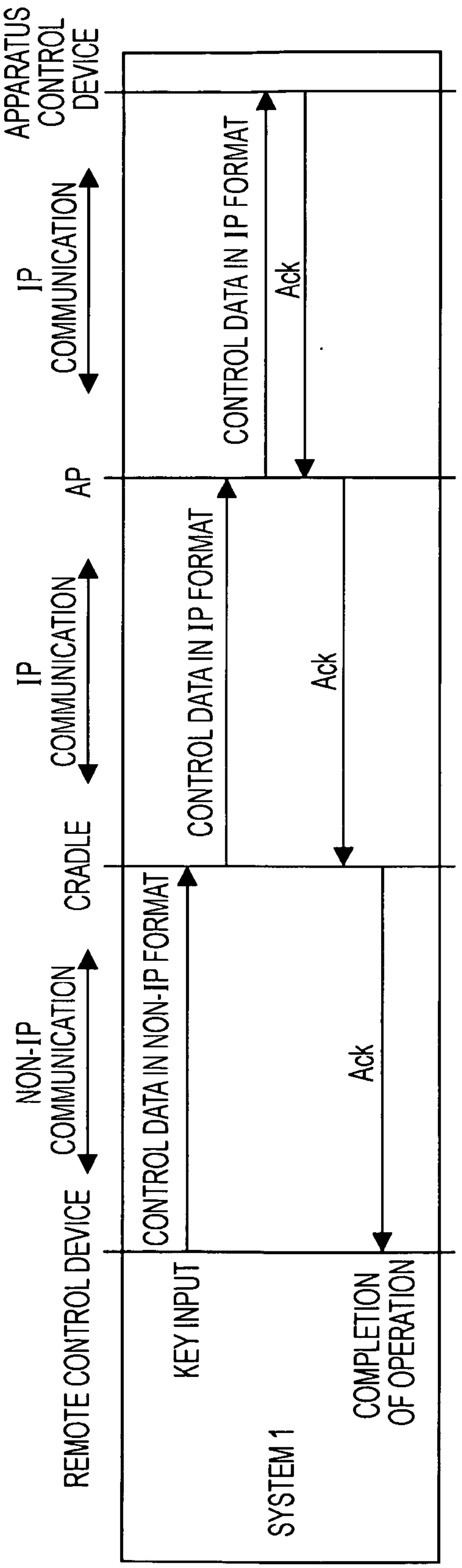
FIG. 11 shows a communication sequence according to a first exemplary embodiment of the present invention, when a key input operation is performed once.

FIG. 11 shows a communication sequence of the system configuration (i.e., system 1) according to the first exemplary embodiment. In this example, the key input operation is carried out once. The remote control device 1 sends the control data necessary for the infrared control operation to the apparatus control device 5 using, for example, SOAP (Simple Object Access Protocol) messages. Likewise, the apparatus control device 5 sends back responses (i.e., Ack signals) to the remote control device 1 using the SOAP messages.

As shown in FIG. 11, the remote control device 1 sends the control data to the cradle 2 using the non-IP communication. Then, the cradle 2 converts the received control data into the IP format, and sends the converted control data to the AP 3 using the IP communication. The AP 3, in turn, sends the control data to the apparatus control device 5. Upon receiving the control data, the apparatus control device 5 sends back a response (i.e., an Ack signal) to the sender to notify that the data transfer has been successfully completed. This Ack signal is sequentially transferred to AP 3 and cradle 2. The cradle 2 then performs the conversion processing from the IP format into the non-IP format on the Ack signal, and transfers the converted Ack signal to the remote control device 1. When the remote control device 1 receives the Ack signal, the steps of the processing caused by the key input operation are completed.

Figure 12:
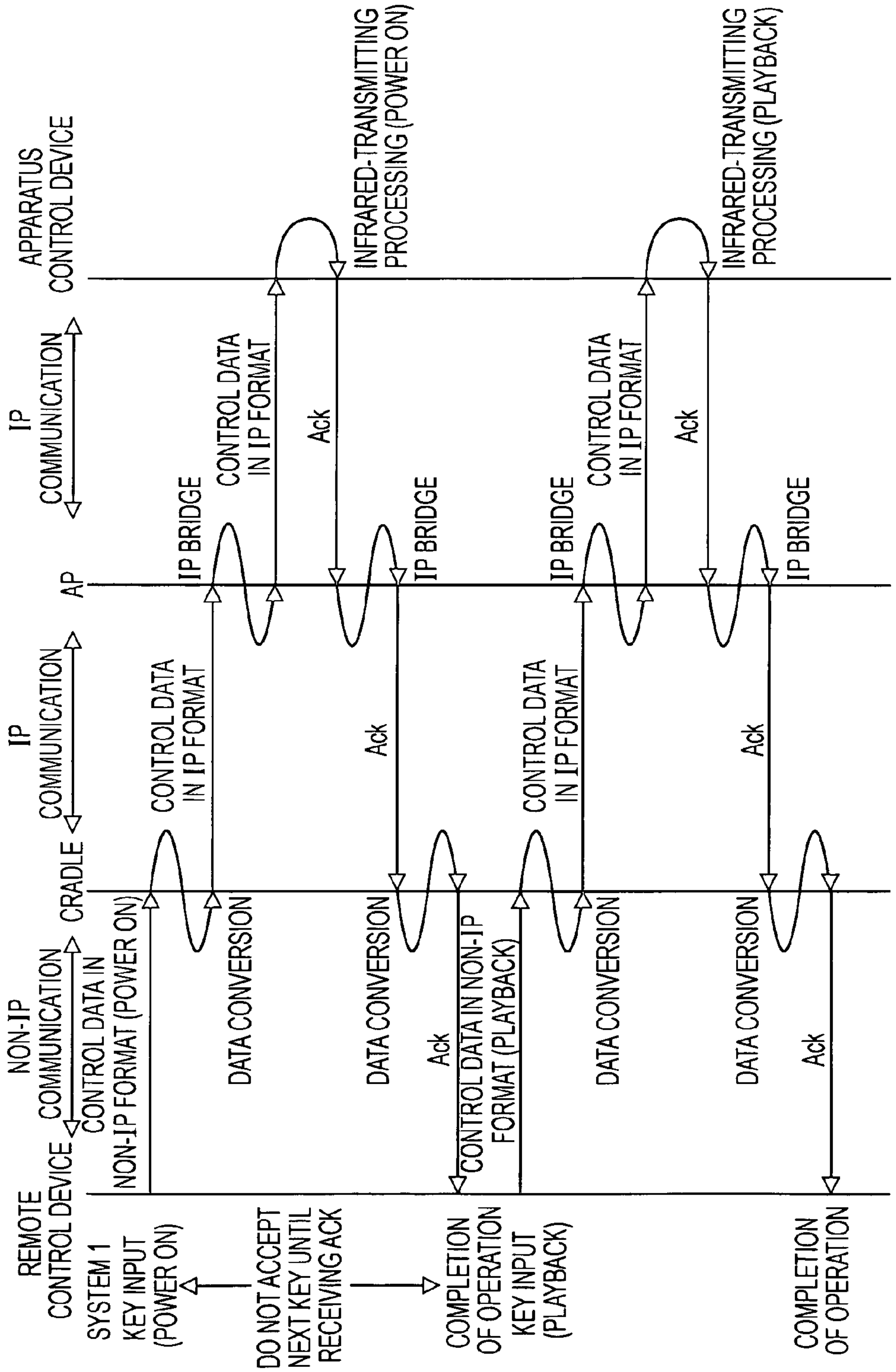
FIG. 12 shows a communication sequence according to a first exemplary embodiment of the present invention, when a key input operation is performed twice.

FIG. 12 shows a communication sequence of the system configuration (i.e., system 1) according to the first exemplary embodiment, when the key input operation is performed twice. In this example, a VTR (Video Tape Recorder) is used as the target electronic apparatus. Also, the first and second key input operations are to instruct power on of the VTR and playback, respectively. As shown in FIG. 12, when the key input operation is performed more than once, the system 1 is configured not to accept the second key input (e.g., playback) until receiving the Ack signal for the first key input (e.g., power on).

According to the first exemplary embodiment having the above-described configuration, the first table and the second table are stored in the nonvolatile memory 26. In the first table, the port numbers P1 to P5 assigned to the ports of the apparatus control device 5 and the electronic apparatuses 11 to 15 connected to one of the ports are associated. In the second table, the electronic apparatuses 11 to 15 and the infrared codes used for controlling the corresponding electronic apparatuses are associated. The control data necessary for the infrared control operation corresponding to the key input includes the port number and the infrared codes of the electronic apparatus associated with the port number. Accordingly, even when a plurality of electronic apparatuses is connected to the apparatus control device 5, the target electronic apparatus can be easily identified using the port number included in the control data, thus causing the target electronic apparatus to perform the desired operation.

A second embodiment of the present invention will be described next.

Figure 13:
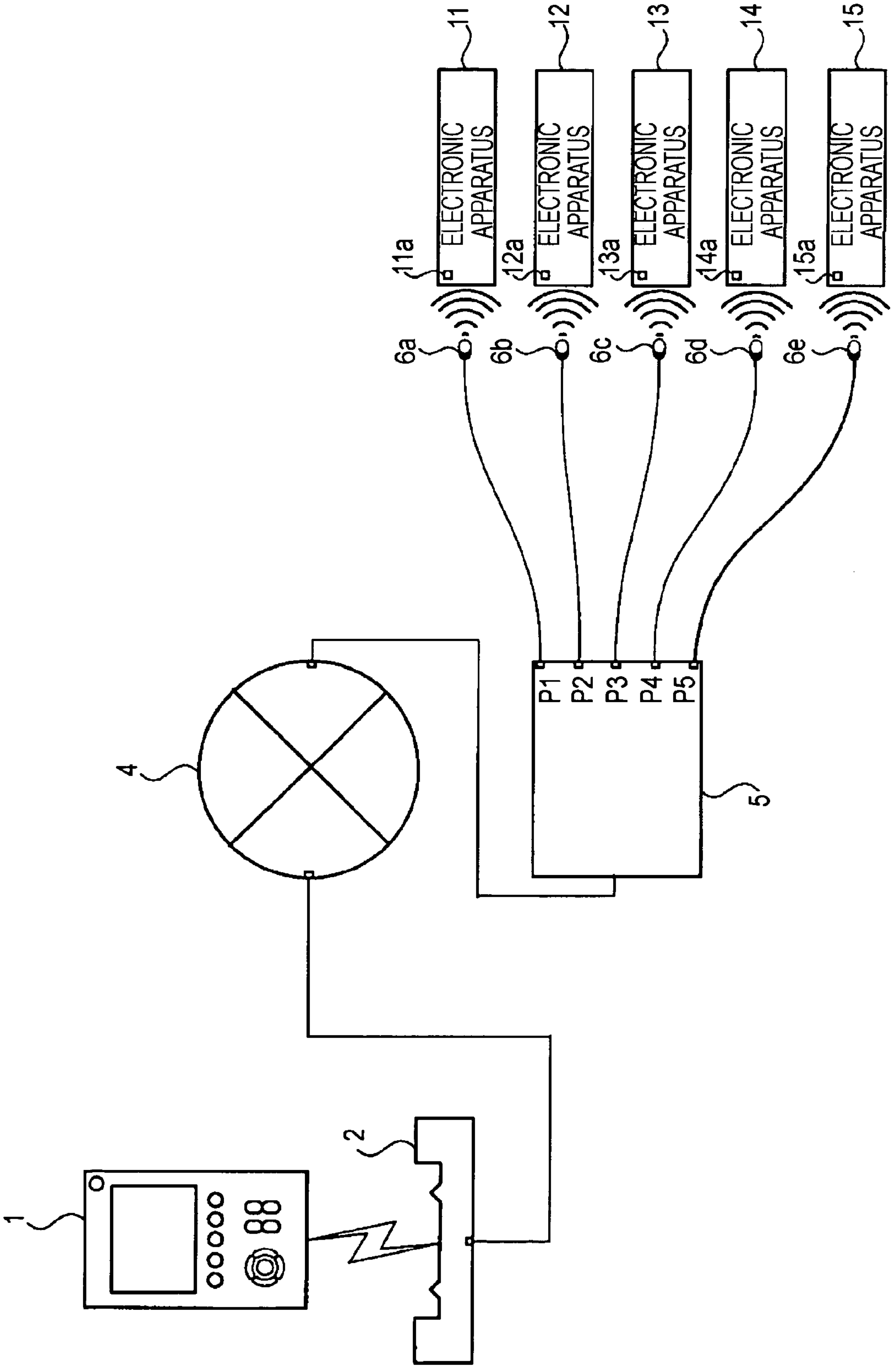
FIG. 13 shows a system configuration according to a second exemplary embodiment of the present invention.

FIG. 13 shows a system configuration according to the second exemplary embodiment of the present invention. This system configuration is equivalent to a system configuration shown in FIG. 1 without an AP 3. More specifically, the system according to the second embodiment includes a remote control device 1, a cradle 2, a communication network 4, and an apparatus control device 5.

In the above-described system, the remote control device 1 and the cradle 2 communicate with each other via a non-IP wireless connection. The cradle 2, the communication network 4, and the apparatus control device 5 communicate with each other using IP. The cradle 2 performs conversion processing in order to handle non-IP data sent from the remote control device 1 in the IP, and sends the converted data to the communication network 4 constructed using Ethernet® or the like. From the data sent from the communication network 4 using the IP, the apparatus control device 5 extracts information necessary for an infrared control operation. Then, the apparatus control device 5 transmits the extracted information using infrared signals so as to control the electronic apparatuses connected thereto.

The system according to the second exemplary embodiment operates in the same manner shown in the flowchart of the FIG. 7, which illustrates the operation of the system according to the first exemplary embodiment.

Figure 14:
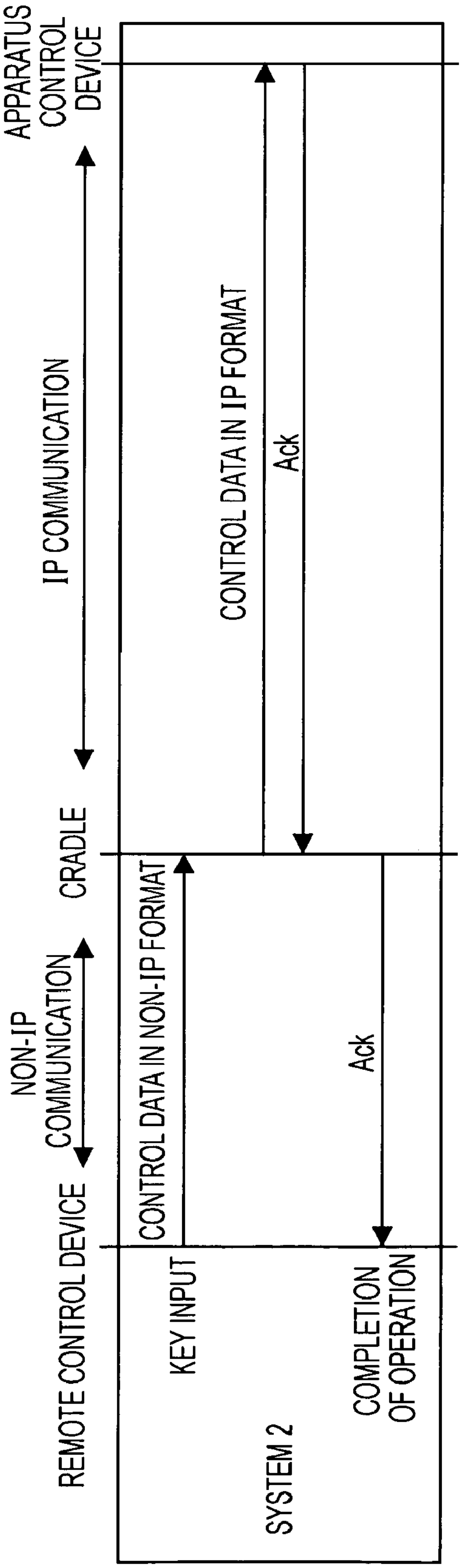
FIG. 14 shows a communication sequence according to a second exemplary embodiment of the present invention.

FIG. 14 shows a communication sequence of the system configuration (i.e., system 2) according to the second exemplary embodiment shown in FIG. 13. In this example, a key input operation is carried out once. As shown in FIG. 14, the remote control device 1 sends control data necessary for an infrared control operation to the cradle 2 using the non-IP. Then, the cradle 2 converts the received control data into an IP format, and sends the converted control data to the apparatus control device 5 using the IP communication. Upon receiving the control data, the apparatus control device 5 sends back a response (i.e., an Ack signal) to the cradle 2 to notify that the data transfer has been successfully completed. The cradle 2 then performs the conversion processing from the IP format into a non-IP format on the Ack signal, and transfers the converted Ack signal to the remote control device 1. When the remote control device 1 receives the Ack signal, the steps of the processing caused by the key input operation are completed.

According to the second exemplary embodiment having the above-described configuration, by using the IP communication unit 32 of the cradle 2, the cradle 2 and the communication network 4 communicate with each other via an IP communication network constructed with cables such as Ethernet. Additionally, the system configuration according to the second exemplary embodiment can provide the same advantages as the system configuration according to the first exemplary embodiment.

Now, a third embodiment of the present invention will be described.

Figure 15:
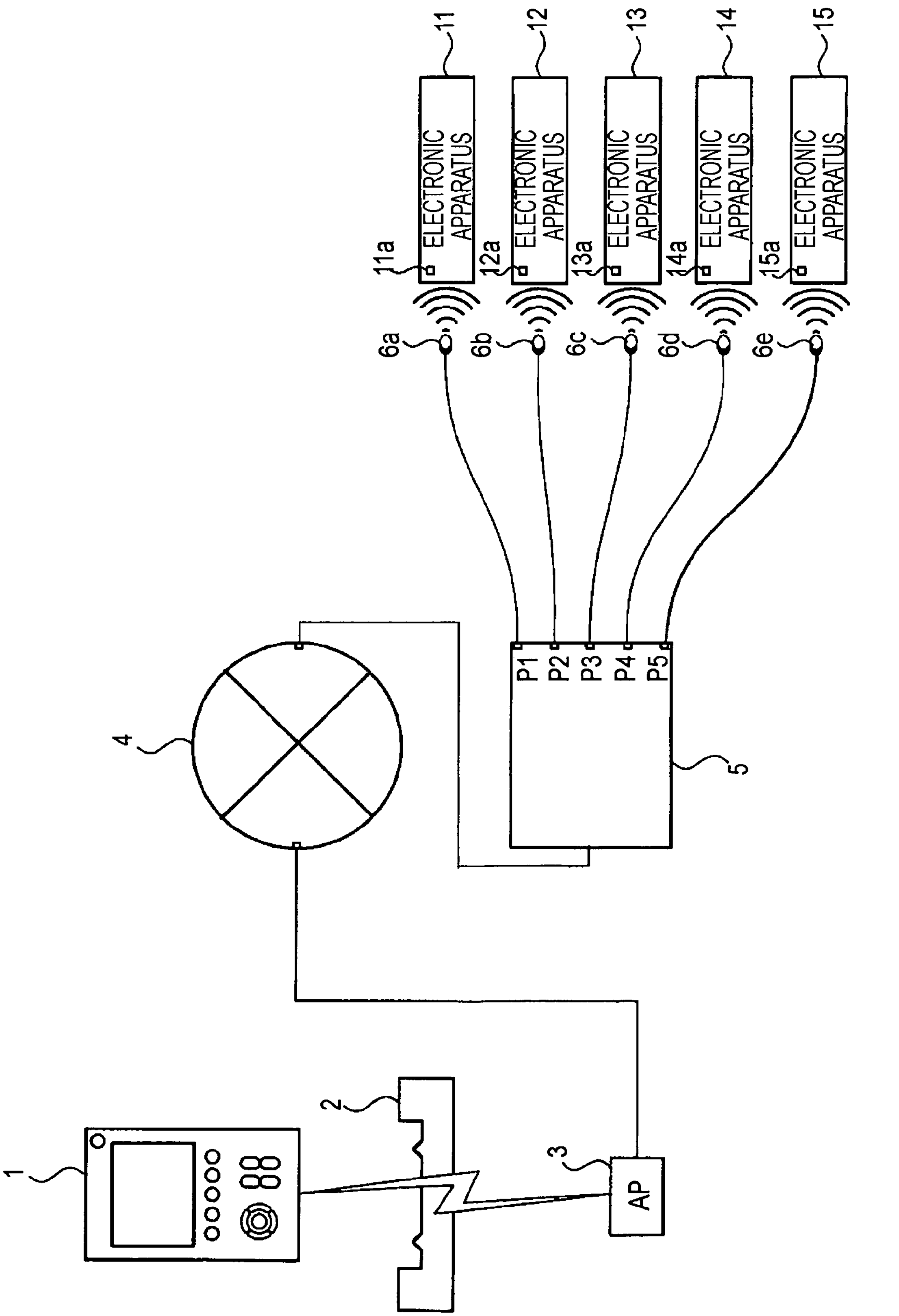
FIG. 15 shows a system configuration according to a third exemplary embodiment of the present invention.

FIG. 15 shows a system configuration according to the third embodiment of the present invention. This system configuration is equivalent to a system configuration shown in FIG. 1 without a cradle 2. More specifically, the system according to the third embodiment includes a remote control device 1, an AP 3, a communication network 4, and an apparatus control device 5.

In the above-described system, the remote control device 1 and the AP 3 communicate with each other via an IP wireless connection. Also, the AP 3, the communication network 4, and the apparatus control device 5 communicate with each other using IP. From data sent from the communication network 4 using the IP, the apparatus control device 5 extracts information necessary for an infrared control operation. Then, the apparatus control device 5 transmits the extracted information using infrared signals so as to control the electronic apparatuses connected thereto.

Referring back to the flowchart of FIG. 7, in the third embodiment, the remote control device 1 identifies that the IP communication is to be used between the remote control device 1 and the AP 3 (at STEP S6), and creates data used in the IP communication (at STEP S16). Then, the remote control device 1 performs IP communication processing (at STEP S17), and sends control data necessary for the infrared control operation to the apparatus control device 5 without passing through the cradle 2. The apparatus control device 5 performs the IP communication processing, and receives the control data (at STEP S11). Then, the process proceeds to STEP 12. Regarding the steps other than those described here, the same processing as in the first embodiment is performed.

Figure 16:
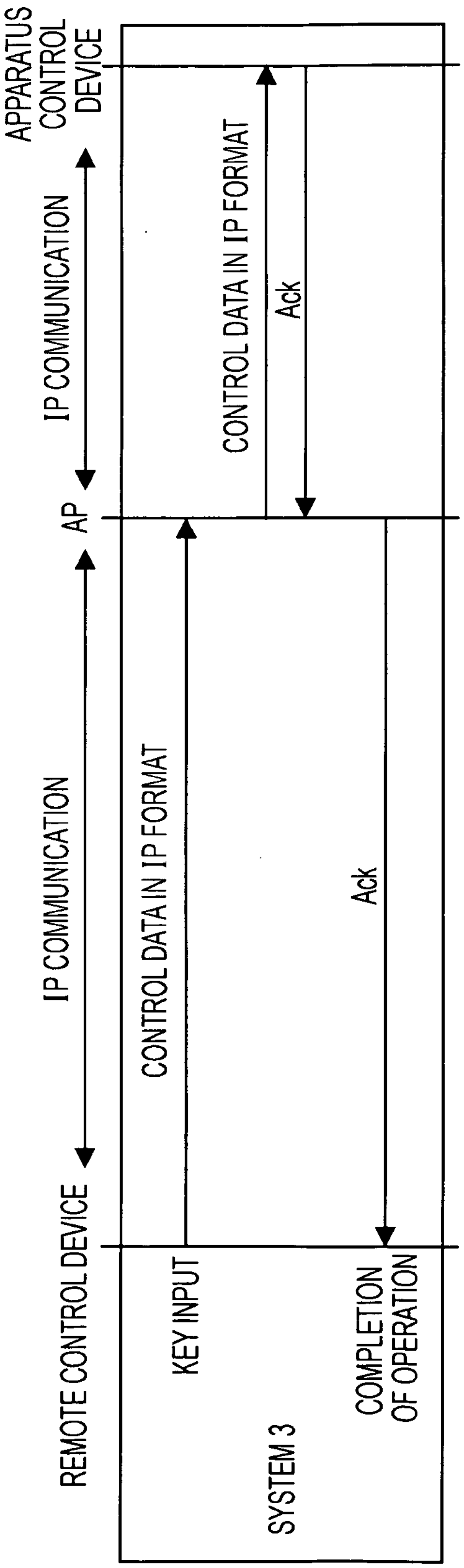
FIG. 16 shows a communication sequence according to a third exemplary embodiment of the present invention.

FIG. 16 shows a communication sequence of the system configuration (i.e., system 3) according to the third embodiment of the present invention shown in FIG. 15. In this example, a key input operation is carried out once. As shown in FIG. 16, the remote control device 1 sends the control data necessary for the infrared control operation to the AP 3 using the IP. The AP 3, in turn, sends the control data in the IP format to the apparatus control device 5 using the IP communication. Upon receiving the control data, the apparatus control device 5 sends back a response (i.e., an Ack signal) to the AP 3 to notify that the data transfer has been successfully completed. The AP 3 then transfers the Ack signal to the remote control device 1. When the remote control device 1 receives the Ack signal, the steps of the processing caused by the key input operation are completed.

According to the third embodiment having the above-described configuration, by using the IP wireless communication unit 25 of the remote control device 1, the remote control device 1 and the AP 3 can wirelessly communicate with each other using the IP wireless communication. Additionally, the system configuration according to the third exemplary embodiment can provide the same advantages as the system configuration according to the first exemplary embodiment.

A fourth exemplary embodiment of the present invention will be described next.

Figure 17:
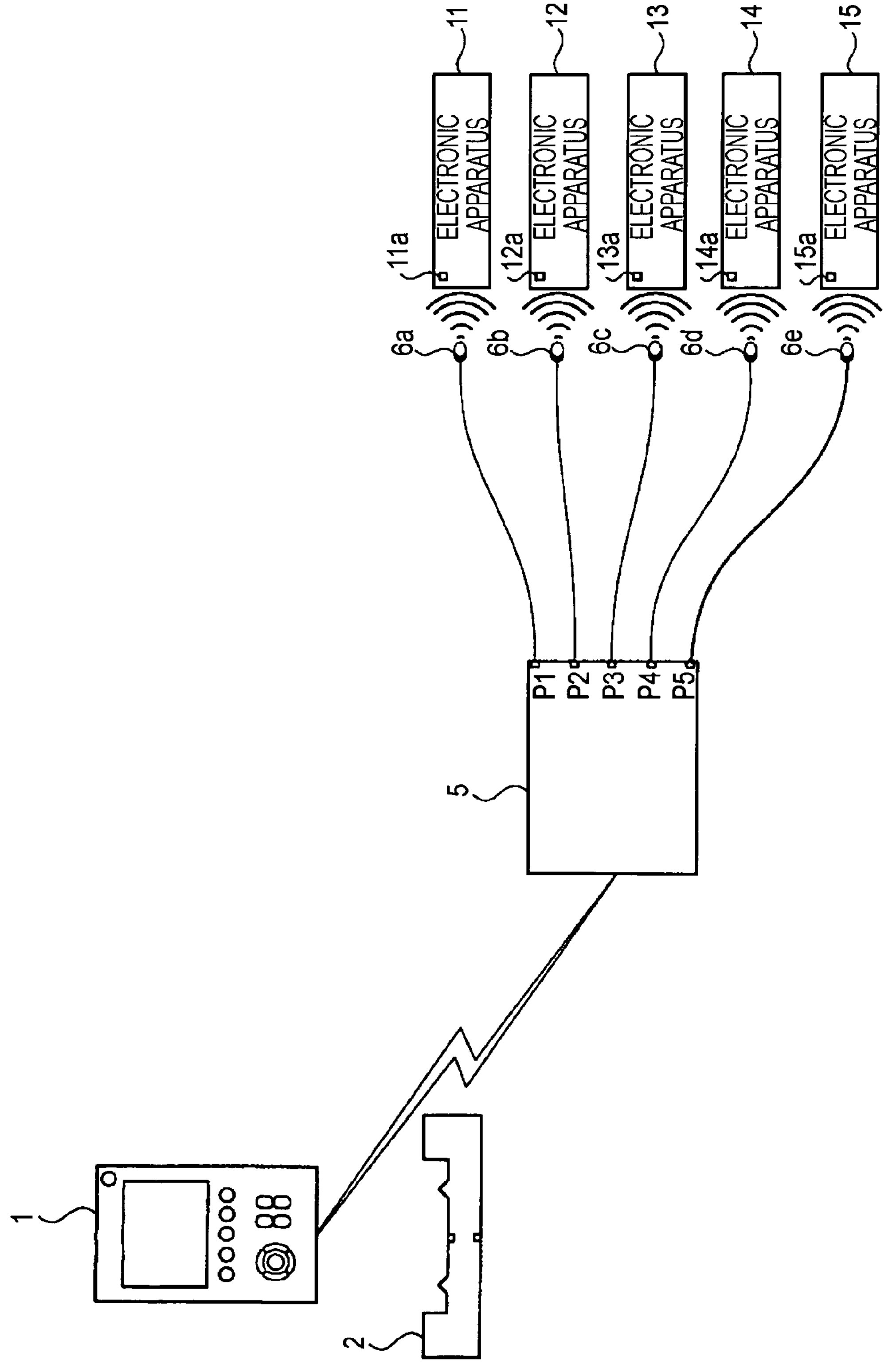
FIG. 17 shows a system configuration according to a fourth embodiment of the present invention.

FIG. 17 shows a system configuration according to the fourth embodiment of the present invention. This system is equivalent to a system configuration shown in FIG. 1 without a cradle 2, an AP 3, and a communication network 4. More specifically, the system according to the fourth embodiment of the present invention includes a remote control device 1 and an apparatus control device 5 for directly communicating with the remote control device 1.

In this embodiment, the remote control device 1 and the apparatus control device 5 communicate with each other directly using wireless communication, such as infrared communication. From the data sent from the remote control device 1 using non-IP, the apparatus control device 5 extracts information necessary for an infrared control operation. Then, the apparatus control device 5 sends the extracted information using infrared signals so as to control electronic apparatuses connected thereto.

Referring back to the flowchart of FIG. 7, in the fourth embodiment, after performing the processing at STEP S7, the remote control device 1 directly sends control data necessary for the infrared control operation to the apparatus control device 5 using a non-IP communication. Then, the apparatus control device 5 performs the non-IP communication processing (at STEP S18), and receives the control data. The process proceeds to STEP S13 next. Regarding the steps other than those described here, the same processing as in the first embodiment is performed.

Figure 18:
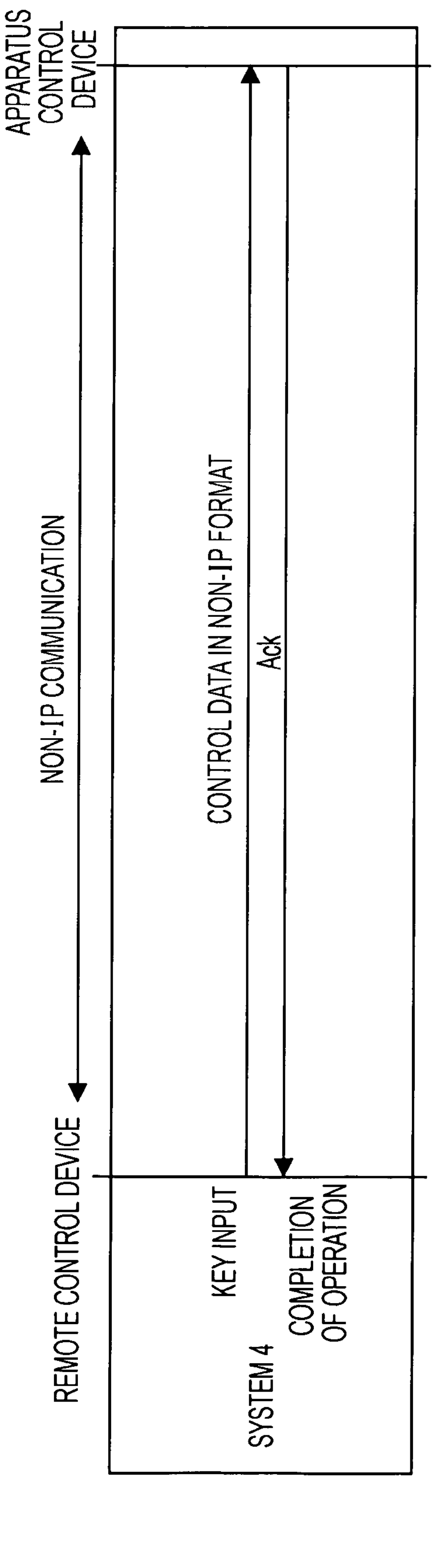
FIG. 18 shows a communication sequence according to a fourth embodiment of the present invention.

FIG. 18 shows a communication sequence of the system configuration (i.e., system 4) according to the fourth embodiment of the present invention shown in FIG. 17. In this example, a key input operation is carried out once. As shown in FIG. 18, the remote control device 1 sends the control data necessary for the infrared control operation to the apparatus control device 5 using the non-IP communication. Upon receiving the control data, the apparatus control device 5 sends back a response (i.e., an Ack signal) to the remote control device 1 to notify that the data transfer has been successfully completed. When the remote control device 1 receives the Ack signal, the steps of processing caused by the key input operation are completed.

According to the fourth exemplary embodiment having the configuration described above, by using the non-IP wireless communication unit 24 of the remote control device 1, the remote control device 1 and the apparatus control device 5 communicate with each other directly. Additionally, the system configuration according to the fourth exemplary embodiment can provide the same advantages as the system configuration according to the first exemplary embodiment.

As described in the first, second, and third embodiments, communication between a remote control device 1 and an apparatus control device 5 may be partly implemented via an IP network constructed using Ethernet or the like. In such a case, control operations of a plurality of electronic apparatuses connected to the apparatus control device 5 can be performed not only from inside the home through a LAN but also from outside the home through Internet.

It is to be understood that the present invention is not limited to the foregoing embodiments, and that various modifications and alterations can be made without departing from the scope and spirit of the present invention.

What is claimed is:

1. A remote control device which remotely controls a plurality of electronic apparatuses connected to an apparatus control device, the remote control device comprising:

a key-inputting unit in which an input operation for instructing an infrared remote control operation of at least one of the electronic apparatuses to be performed is inputted;

a storage unit that stores a first table in which port numbers assigned to ports of the apparatus control device and the electronic apparatuses connected to the corresponding port are associated, and stores a second table in which the electronic apparatuses and infrared codes for controlling the corresponding electronic apparatuses are associated; and a control unit which registers port number information in the first table and type information of the at least one of the electronic apparatuses to be controlled in the second table, identifies content of the input operation based on the set port number information and the set type information, determines if the content of the input operation is valid, sends control data necessary for an infrared control operation of at least one of the electronic apparatuses corresponding to the input operation when the content of the input operation is valid, which control data includes a port number associated with the selected electronic apparatus in the first table and the infrared code for the selected electronic apparatus, and receives a response signal from the apparatus control device indicating that the input operation for instructing an infrared remote control operation of at least one of the electronic apparatuses has been successfully received by the apparatus control device, wherein the control unit does not send subsequent control data for subsequent infrared control operations until the response signal indicating that the input operation has been successfully received by the apparatus control device is received by the control unit.

2. The remote control device according to claim 1, wherein the control data necessary for the infrared control operation is sent from the remote control device to the apparatus control device directly or through a communication network.

3. The remote control device according to claim 1, further comprising:

a cradle which holds the remote control device, wherein the control data necessary for the infrared control operation is sent to the apparatus control device through the cradle.

4. A remote control method for remotely controlling a plurality of electronic apparatuses connected to an apparatus control device using a remote control device, the remote control method comprising:

registering set type information and port number of the electronic apparatus to be controlled in the remote control device;

key-inputting an operation in the remote control device;

causing the remote control device to determine if content of the key-inputted operation is valid, the content of the key-inputted operation is based on the set type information of the port number;

causing the remote control device to send, to the apparatus control device, control data necessary for a first infrared control operation corresponding to the key-inputted operation if the content of the key-inputted operation is valid, which control data includes a port number, assigned to a port of the apparatus control device, associated with a selected electronic apparatus and an infrared code for controlling the selected apparatus control device;

causing the apparatus control device to receive the control data necessary for the first infrared control operation sent from the remote control device;

causing the apparatus control device to determine if the control data necessary for the first infrared control operation is valid;

causing the apparatus control device to generate an infrared signal based on the infrared code included in the received control data necessary for the first infrared control operation if the control data necessary for the first infrared control operation is valid;

causing only an infrared-transmitting unit connected to the port specified by the port number included in the control data necessary for the first infrared control operation to transmit the infrared signal to the electronic apparatus corresponding to the infrared-transmitting unit; and causing the apparatus control device to send a response signal to the remote control device when the apparatus control device successfully receives the control data necessary for the first infrared control operation, wherein the remote control device does not send a second control data for a second infrared control operation which is different than the first infrared control operation until receiving the response signal sent by the apparatus control device for the first infrared control operation indicating that the first infrared control operation has been successfully received.

5. The remote control method according to claim 4, wherein the remote control device, sends the control data necessary for a first infrared control operation, to the apparatus control device through a cradle.

6. The remote control method according to claim 5, wherein the remote control device sends the control data to the cradle using non-IP communication.

7. The remote control method according to claim 4, wherein the remote control method further comprises:

causing the remote control device to send, to the apparatus control device, control data necessary for the second infrared control operation, upon receiving the response from the apparatus control device, which control data includes a port number, assigned to a port of the apparatus control device, associated with a selected electronic apparatus and an infrared code for controlling the selected apparatus control device;

causing the apparatus control device to receive the control data necessary for the second infrared control operation sent from the remote control device;

causing the apparatus control device to generate an infrared signal based on the infrared code included in the received control data necessary for the second infrared control operation; and causing an infrared-transmitting unit, connected to the port specified by the port number included in the control data necessary for the second infrared control operation, to transmit the infrared signal to the electronic apparatus corresponding to the infrared-transmitting unit.

8. A remote control method for remotely controlling a plurality of electronic apparatuses connected to an apparatus control device using a remote control device, the remote control method comprising:

causing the remote control device to send, to the apparatus control device, control data necessary for a first infrared control operation, which control data includes a port number, assigned to a port of the apparatus control device, associated with a selected electronic apparatus and an infrared code for controlling the selected apparatus control device;

causing the apparatus control device to receive the control data necessary for the first infrared control operation sent from the remote control device;

causing the apparatus control device to generate an infrared signal based on the infrared code included in the received control data necessary for the first infrared control operation; and causing an infrared-transmitting unit, connected to the port specified by the port number included in the control data necessary for the first infrared control operation, to transmit the infrared signal to the electronic apparatus corresponding to the infrared-transmitting unit;

causing the apparatus control device to send a response to the remote control device when the apparatus control device receives the control data necessary for the first infrared control operation;

causing the remote control device to send, to the apparatus control device, control data necessary for a second infrared control operation, upon receiving the response from the apparatus control device, which control data includes a port number, assigned to a port of the apparatus control device, associated with a selected electronic apparatus and an infrared code for controlling the selected apparatus control device;

causing the apparatus control device to receive the control data necessary for the second infrared control operation sent from the remote control device;

causing the apparatus control device to generate an infrared signal based on the infrared code included in the received control data necessary for the second infrared control operation; and causing an infrared-transmitting unit, connected to the port specified by the port number included in the control data necessary for the second infrared control operation, to transmit the infrared signal to the electronic apparatus corresponding to the infrared-transmitting unit.

* * * * *